US010205590B2

(12) United States Patent
Cipu et al.

(10) Patent No.: US 10,205,590 B2
(45) Date of Patent: Feb. 12, 2019

(54) METHODS, SYSTEMS, AND COMPUTER READABLE MEDIA FOR REDUCING THE SIZE OF A CRYPTOGRAPHIC KEY IN A TEST SIMULATION ENVIRONMENT

(71) Applicant: Ixia, Calabasas, CA (US)

(72) Inventors: Andrei Cipu, Bucharest (RO); Alexandru Badea, Bucharest (RO)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 0 days.

(21) Appl. No.: 14/966,552

(22) Filed: Dec. 11, 2015

(65) Prior Publication Data
US 2017/0170956 A1    Jun. 15, 2017

(30) Foreign Application Priority Data
Dec. 10, 2015   (RO) .................................. 2015 00986

(51) Int. Cl.
*H04L 9/08* (2006.01)
*G06F 17/50* (2006.01)
*G06F 11/26* (2006.01)

(52) U.S. Cl.
CPC .......... *H04L 9/0819* (2013.01); *G06F 11/261* (2013.01); *G06F 17/5009* (2013.01); *H04L 2209/24* (2013.01)

(58) Field of Classification Search
None
See application file for complete search history.

(56) References Cited

U.S. PATENT DOCUMENTS

| 4,200,770 A | 4/1980 | Hellman et al. |
|---|---|---|
| 2006/0105741 A1 | 5/2006 | Suh et al. |
| 2008/0010523 A1 | 1/2008 | Mukherjee |
| 2010/0058053 A1 | 3/2010 | Wood et al. |
| 2012/0102298 A1* | 4/2012 | Sengupta .......... G06F 17/30949 711/216 |

(Continued)

OTHER PUBLICATIONS

Examiner's Answer Before the Patent Trial and Appeal Board for U.S. Appl. No. 14/014,315 (dated Jun. 2, 2016).

(Continued)

*Primary Examiner* — Joseph P Hirl
*Assistant Examiner* — Hassan Saadoun

(57) ABSTRACT

Methods and systems for reducing the size of a cryptographic key in a test simulation environment are disclosed. In one example, a method includes determining a minimum key size value and maximum key size value for a private cryptographic key for each of a plurality of key exchange value pairs and deriving, for each of the plurality of key exchange value pairs, a key sizing constant based on the minimum key size value and the maximum key size value. The method further includes storing each of the plurality of selected key exchange value pairs and associated key sizing constant in a data store, selecting a key exchange value pair to be applied to a test simulation session conducted between a first test simulation endpoint and a second test simulation endpoint, and generating a private cryptographic key based on the key sizing constant associated with the selected key exchange value pair.

17 Claims, 3 Drawing Sheets

(56) References Cited

U.S. PATENT DOCUMENTS

2012/0182884 A1* 7/2012 Pyatkovskiy ......... H04L 43/028
　　　　　　　　　　　　　　　　　　　　　370/250
2015/0067333 A1　　3/2015　Cipu et al.

OTHER PUBLICATIONS

"Diffie-Hellman key exchange," https://en.wikipedia.org/wiki/Diffie%E2%80%93 Hellman_key_exchange, pp. 1-11 (Jan. 23, 2016).
Advisory Action Before the Filing of an Appeal Brief for U.S. Appl. No. 14/014,315 (dated Sep. 30, 2015).
Final Office Action for U.S. Appl. No. 14/014,315 (dated Jun. 18, 2015).
"IxLoad™—Multiplay Service and Application Delivery Platform Testing," Overview, Data Sheet, pp. 1-11 (Jun. 2015).
Non-Final Office Action for U.S. Appl. No. 14/014,315 (dated Dec. 19, 2014).
Kaufman et al., "Internet Key Exchange Protocol Version 2 (IKEv2)," RFC 7296, pp. 1-142 (Oct. 2014).
Decision on Appeal for U.S. Appl. No. 14/014,315 (Oct. 27, 2017).
Non-Final Office Action for U.S. Appl. No. 14/014,315 (dated Feb. 7, 2018).
Final Office Action for U.S. Appl. No. 14/014,315 (dated Sep. 11, 2018).
Maughan et al., "Internet Security Association and Key Management Protocol (ISAKMP)," RFC 2408, pp. 1-86 (Nov. 1998).

\* cited by examiner

300

302 — DETERMINE A MINIMUM KEY SIZE AND A MAXIMUM KEY SIZE FOR EACH OF A PLURALITY OF KEY EXCHANGE NUMBER PAIRS

304 — UTILIZE THE MINIMUM KEY SIZE AND MAXIMUM KEY SIZE TO DERIVE A KEY SIZING CONSTANT FOR EACH KEY EXCHANGE NUMBER PAIR

306 — STORE THE KEY SIZING CONSTANT WITH ITS ASSOCIATED KEY EXCHANGE NUMBER PAIR

308 — SELECT A KEY EXCHANGE NUMBER PAIR TO BE USED IN A TEST SIMULATION SESSION

310 — SELECT THE KEY SIZING CONSTANT ASSOCIATED WITH THE SELECTED KEY EXCHANGE NUMBER PAIR

312 — GENERATE A PRIVATE KEY UTILIZING THE SELECTED KEY SIZING CONSTANT

FIG. 3

METHODS, SYSTEMS, AND COMPUTER READABLE MEDIA FOR REDUCING THE SIZE OF A CRYPTOGRAPHIC KEY IN A TEST SIMULATION ENVIRONMENT

PRIORITY CLAIM

This application claims the benefit of Romanian Patent Application No. a 2015 00986 filed Dec. 10, 2015; the disclosure of which is incorporated herein by reference in its entirety.

TECHNICAL FIELD

The subject matter described herein relates to conducting packet traffic simulations in a test simulation environment. More particularly, the subject matter described herein relates to methods, systems, and computer readable media for reducing the size of a cryptographic key in a test simulation environment.

BACKGROUND

Diffie-Hellman key exchange is an integral part of the Internet protocol security (IPsec) tunnel establishment process. However, this key exchange process accounts for a considerable amount of the processing time required to establish an IPsec tunnel. Specifically, the generation of a private cryptographic key, a public cryptographic key, and an associated shared secret key can be extremely computationally intensive. Despite this significant drawback, large numbers of IPsec tunnels need to be established as promptly as possible in a test simulation environment. Thus, any reduction of time associated with the determining of encryption keys may be extremely beneficial for the sake of testing efficiency.

Thus, there exists a need for methods, systems, and computer readable media for reducing the size of a cryptographic key in a test simulation environment.

SUMMARY

Methods, systems, and computer readable media for reducing the size of a cryptographic key in a test simulation environment are disclosed. In one embodiment, In one example, a method includes determining a minimum key size value and maximum key size value for a private cryptographic key for each of a plurality of key exchange value pairs and deriving, for each of the plurality of key exchange value pairs, a key sizing constant based on the minimum key size value and the maximum key size value. The method further includes storing each of the plurality of selected key exchange value pairs and associated key sizing constant in a data store, selecting a key exchange value pair to be applied to a test simulation session conducted between a first test simulation endpoint and a second test simulation endpoint, and generating a private cryptographic key based on the key sizing constant associated with the selected key exchange value pair.

The subject matter described herein for reducing the size of a cryptographic key may be implemented in hardware, software, firmware, or any combination thereof. As such, the terms "function", "module", "unit", or "node" as used herein refer to hardware, which may also include software and/or firmware components, for implementing the feature being described. In one exemplary implementation, the subject matter described herein may be implemented using a computer readable medium having stored thereon computer executable instructions that when executed by a hardware based processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 3 illustrates a flow chart of a method for reducing the size of a cryptographic key in a test simulation environment according to an embodiment of the subject matter described herein.

DETAILED DESCRIPTION

Methods, systems, and computer readable media for reducing the size of a cryptographic key are disclosed. In one embodiment, the present subject matter involves the computation, by one or more test simulation endpoint devices (e.g., traffic emulation device and/or a device under test), of at least one key sizing constant that may be used to reduce the size of one or more cryptographic keys that are used for conducting a test simulation session (e.g., prior to any actual IPsec tunnel establishment). Notably, the present subject matter minimizes the time spent calculating and utilizing the resource intensive cryptographic keys, which effectively enables a large number of IPsec tunnels to be established in a test simulation environment.

Figure 1:
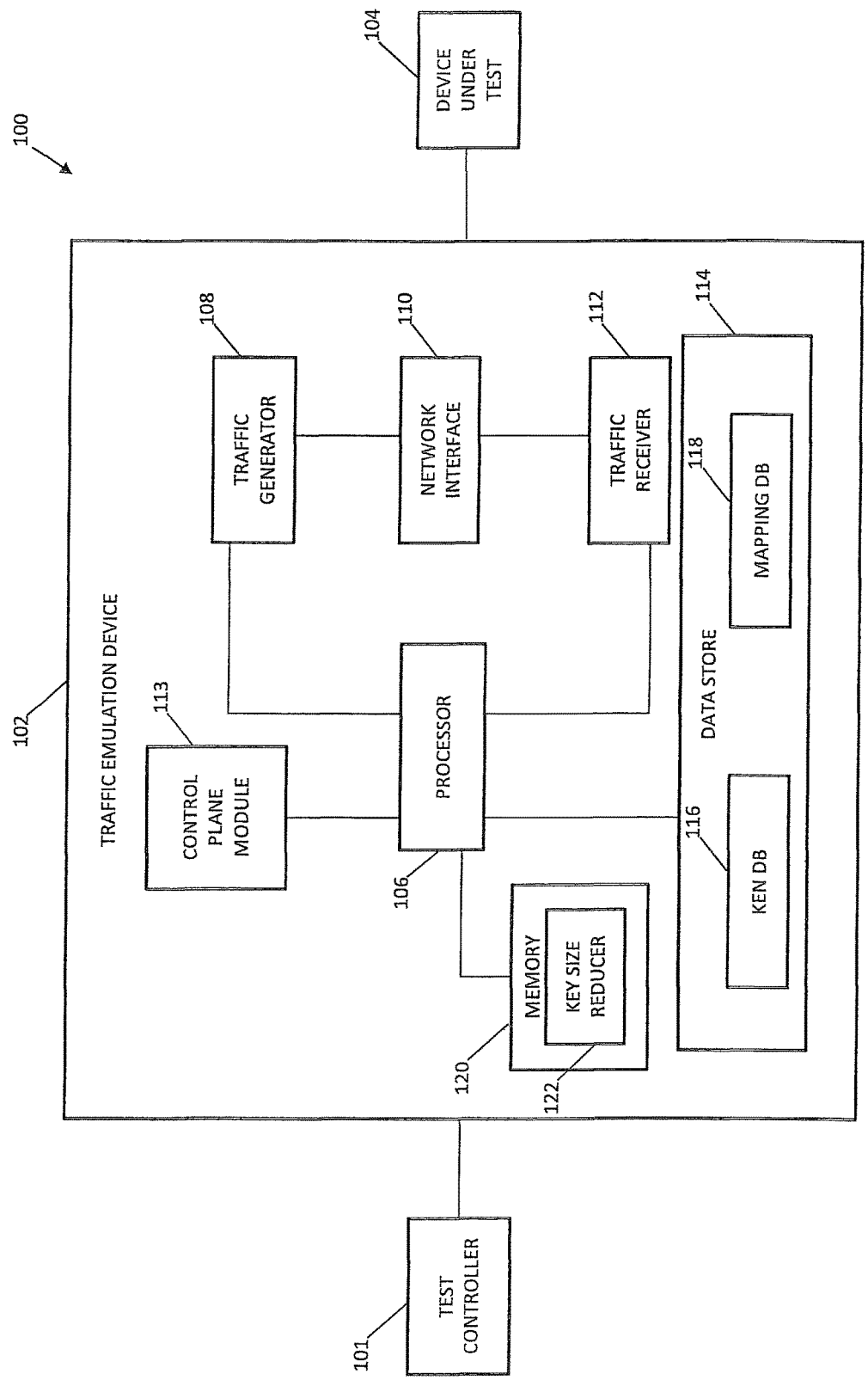
FIG. 1 illustrates a block diagram of an exemplary system for reducing the size of a cryptographic key in a test simulation environment according to an embodiment of the subject matter described herein.

FIG. 1 is a block diagram illustrating an exemplary architecture for a test simulation system 100 according to an embodiment of the subject matter described herein. Referring to FIG. 1, system 100 includes a traffic emulation device 102 that is communicatively connected to a test controller device 101 and a device under test (DUT) 104. In some embodiments, DUT 104 may include a serving gateway (SGW), a packet data network gateway (PGW), a firewall device, a router device, a network address translation (NAT) device, or any device or system that may benefit from high throughput traffic simulation testing. In one embodiment, DUT 104 may be communicatively connected to traffic emulation device 102 via a wired or wireless connection that facilitates the transfer of encrypted packet traffic.

In some embodiments, traffic emulation device 102 may include a hardware based device or equipment that is configured to generate and send packet traffic to DUT 104 for load test simulation purposes. In one embodiment, traffic emulation device 102 may include a processor 106, a traffic generator 108, a network interface unit 110, a traffic receiver 112, a control plane module 113, local data store 114, and memory 120. Processor 106 may include a central processing unit (CPU), a microcontroller, or any other hardware based processor unit that configured to manage and facilitate the operation of modules 108 and 112 in traffic emulation device 102. Processor 106 may also include memory and various specialized units, circuits, software and interfaces for providing the functionality and features described herein. In some embodiments, traffic emulation device 102 may function as either a client entity or a server entity or both with respect to DUT 104. For example, the traffic emulation device 102 may include a first test simulation endpoint device and a second test simulation endpoint device that establishes test simulation sessions via the system or device to be tested.

In some embodiments, traffic generator 108 may include a voice module, which may be configured to generate audio traffic data, and a video module, which may be configured to generate video traffic data. In one example, a voice module may include a software based module stored in memory (when executed by a hardware based processor 106) that is configured to generate voice based simulation traffic in a particular L4-L7 protocol. For example, traffic generator 108 may be configured to generate real-time transport protocol (RTP) data that is ultimately sent to DUT 104. In some embodiments, traffic generator 108 may be configured to encrypt the generated packet traffic, such as by utilizing IPsec. Packet traffic generated and encrypted by traffic generator 108 is first forwarded to network interface unit 110 prior to its transmission to DUT 104.

In some embodiments, network interface unit 110 may convert the outgoing test packet traffic from traffic generator 108 into an electrical, optical, or wireless signal format that is needed to transmit the test traffic to DUT 104 via a wire link, an optical fiber, a wireless link, or some other communication link. Similarly, network interface unit 110 may receive electrical, optical, or wireless signals from DUT 104 and may be configured to convert the received signals (e.g., packets) into incoming test traffic in a format usable by traffic emulation device 102. Received packets may be forwarded by network interface unit 110 to traffic receiver 112.

In some embodiments, traffic receiver 112 may receive the incoming test traffic from network interface unit 110. Traffic receiver 112 may be configured to determine if each received packet is a member of a specific flow, and may accumulate test statistics for each flow in accordance with test instructions provided by processor 106. The accumulated test statistics may include, for example, a total number of received packets, a number of packets received out-of-sequence, a number of received packets with errors, a maximum, average, and minimum propagation delay, and other statistics for each flow. Traffic receiver 112 may also provide test statistics and/or captured packets to processor 106 for additional analysis during, or subsequent to, the test session. In some embodiments, traffic receiver 112 may also be configured to decrypt packet traffic received from DUT 104.

In some embodiments, control plane module 113 may include a GPRS tunneling protocol (GTP) control plane module that is configured to conduct the negotiation associated with establishing IPsec tunnels in a test session. In some embodiments, the IPsec based test session is conducted between a traffic emulation device and a DUT at a network layer. For example, control plane module 113 may be used to communicate with DUT 104 (e.g., via network interface 110) to establish a plurality of IPsec sessions that may be used to communicate encrypted media traffic.

In some embodiments, processor 106 may be configured to communicate with test controller device 101. Test controller device 101 may be a computing device contained within, or external to, traffic emulation device 102. Test controller device 101 may provide processor 106 with instructions and data used by traffic emulation device 102 to conduct the testing of DUT 104. The instructions and data received by traffic emulation device 102 from test controller device 101 may include, for example, definitions of packet streams to be generated by traffic emulation device 102 and definitions of performance statistics that may be accumulated and reported by traffic emulation device 102. In one embodiment, test controller device 101 may be utilized by a network operator, a test simulation administrator, or any other user to initiate and/or establish parameters for a traffic test simulation involving traffic emulation device 102 and DUT 104.

In some embodiments, local data store 114 may include a hardware based storage, a database, or any other local unit that is capable of electronically storing data information. For example, local data store 114 may be located within traffic emulation device 102. As shown in FIG. 1, local data store 114 may be used to store a key exchange number database 116 and a mapping database 118. In some embodiments, key exchange number database 116 may include database entries that include key exchange number pairs that have been designated as approved and/or acceptable to conduct a test simulation session with a DUT. For example, the database entries may comprise a listing of acceptable p-g pairs (e.g., Diffie Hellman groups) that may be submitted to a DUT or a second test simulation endpoint during a key exchange number negotiation. Notably, each p-g pair is composed of a "p" value (where p is a prime number) and a "g" value (where g is a primitive root modulo of p), which are ultimately applied to a modulo operation to derive a public cryptographic key and a shared secret value useable by a testing endpoint. Similarly, mapping database 118 includes database entries that map each of the acceptable p-g pairs to a precalculated key sizing constant (that is determined in a manner described below). The use of mapping database 118 affords a system administrator the advantage of effectively reducing the size or length of a private cryptographic key for test simulation purposes.

In some embodiments, test controller device 101 may be utilized by a network test operator to provide key exchange numbers to traffic emulation device 102. In response, traffic emulation device 102 may be configured to utilize the received key exchange numbers to calculate the private and/or public cryptographic keys. Notably, determination of private and public cryptographic keys is performed prior to establishing a test session with DUT 104. Traffic emulation device 102 may then subsequently store the calculated private and public cryptographic keys corresponding to key exchange numbers in local data store 114 for later use upon establishing a test session with DUT 104. Traffic emulation device 102 may be configured to store the key exchange numbers in local data store 114 prior to or after the calculation of the private and public cryptographic keys.

Traffic emulation device 102 further includes memory 120, which can comprise random access memory (RAM), read only memory (ROM), optical read/write memory, cache memory, magnetic read/write memory, flash memory, or any other non-transitory computer readable medium. In some embodiments, processor 106 and memory 120 can be used to execute and manage the operation of key sizing reducer 122 (which is stored in memory 120). In some embodiments, key sizing reducer 122 comprises an algorithm that, when executed by processor 106, performs the operations described in FIGS. 2 and 3. Although FIG. 1 only depicts key sizing reducer 122 as being operated by a traffic emulation device 102 (e.g., a first test simulation endpoint), key sizing reducer 122 may be similarly operated by DUT 104 or any other second test simulation endpoint.

After an IPsec tunnel is negotiated and established by control plane unit 113, traffic emulation device 102 may be configured to generate encrypted packet traffic (e.g., a flow of packets). For example, the encrypted traffic data may include RTP traffic data encrypted via IPsec. In one embodiment, traffic generator 108 may be instructed by test controller device 101 to begin generating the traffic data needed for the test session.

After traffic emulator device 102 establishes the IPsec tunnel for communicating the media stream data to DUT 104, traffic emulation device 102 may encrypt the packet traffic data and forward the encrypted packet traffic data to network interface unit 110. Notably, the packet traffic data may be encrypted with a shared secret derived from the reduced size of the private cryptographic key generated by the first test simulation endpoint. Network interface unit 110 subsequently sends the encrypted packet traffic to DUT 104 via the established IPsec tunnel. In one embodiment, the simulated traffic data is encrypted and packetized prior to being sent over the established IPsec tunnel to DUT 104.

Figure 2:
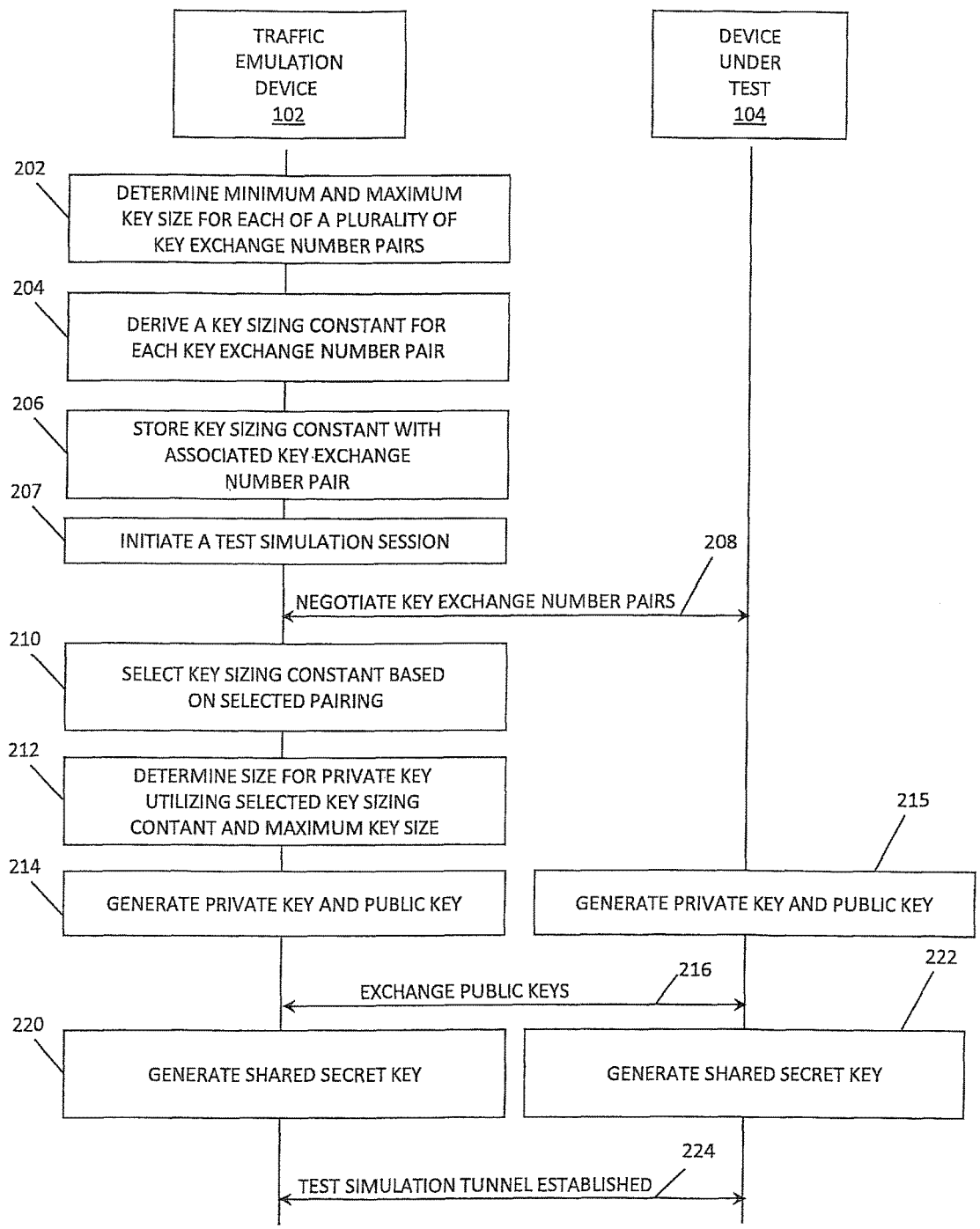
FIG. 2 illustrates a signaling diagram depicting exemplary messaging for reducing the size of a cryptographic key in a test environment according to an embodiment of the subject matter described herein.

An illustration as to how the size of cryptographic keys are reduced is described in FIG. 2. Notably, FIG. 2 illustrates a signaling diagram depicting exemplary messaging for reducing the size of a cryptographic key in a test simulation environment according to an embodiment of the subject matter described herein. In some embodiments, traffic emulation device 102 may first determine a plurality of different key exchange number pairs (e.g., p-g pairs$_{1 \ldots N}$) that may possibly be utilized in a traffic simulation test. Notably, this step is conducted before any test sessions are initiated or established. In some embodiments, traffic emulation device 102 may access its candidate key exchange number list. In some embodiments, a key exchange number "g" may be set to a numerical value that is known by all DUTs, such as g=3. With respect to key exchange number "p", the traffic emulation device may provision a local storage unit (e.g., local memory or a local database) with a plurality of "p" values. Notably, the local storage unit may contain any number of "p" values, each of which is mapped to a corresponding private cryptographic key and a corresponding public cryptographic key that have been predetermined and/or precalculated.

At block 202, traffic emulation device 102 determines the minimum and maximum key size for each of a plurality of key exchange number pairs. Notably, traffic emulation device 102 maintains a list of "p" and "g" value pairs (e.g., Diffie-Hellman groups) that are utilized and/or supported by device 102. In some embodiments, traffic emulation device 102 establishes or determines the key exchange number values (e.g., "p" and "g") that can be utilized in the test simulation with a DUT.

In some embodiments, traffic emulation device 102 may be configured to conduct traffic measurement tests on a trial and error basis to determine the minimum key size and the maximum key size (to be used a private cryptographic key) based on the p and g values used. For example, test simulation trials may determine that $L_{min}$=160 bytes and $L_{max}$=1600 bytes are associated with a particular key exchange number pair including values of p=17 and g=3. Similarly, $L_{min}$ and $L_{max}$ may be derived for each key exchange number pair maintained by traffic emulation device 102 after experimentally establishing a few tunnels (and looking at setup times). For example, the system may establish a few tunnels and record the associated set up times and insert the values in the algorithm.

At block 204, a key sizing constant for each key exchange number pair is derived. In some embodiments, traffic emulation device 102 calculates a key sizing constant by dividing the minimum key size value by the maximum key size value for each associated key exchange number pair. Returning to the original example where the $L_{min}$=160 bytes and $L_{max}$=1600 bytes, the key sizing constant will be determined by traffic emulation device 102 to be equal to 0.1.

At block 206, each of the key sizing constants is stored with the associated key exchange number pairs. In some embodiments, traffic emulator device 102 respectively maps and records the plurality of key sizing constants to their respective key exchange number pair counterparts. Specifically, traffic emulator device 102 may store these recorded mappings of key sizing constants and key exchange number pairs as entries in data store 114.

At block 207, a determination is made to initiate a test session between a first test simulation endpoint (e.g., traffic emulator device 102) and a second test simulation endpoint (e.g., DUT 104). In some embodiments, this determination may be made by a network operator utilizing a test control device (e.g., test controller device 101 in FIG. 1). If an IPsec test session is to be initiated and conducted between the traffic emulation device 102 and DUT 104, then method 200 continues to step 208.

At line 208, key exchange number pairs are negotiated by traffic emulation device 102 and DUT 104. At the onset of this negotiation, test emulation device 102 first selects a plurality of key exchange value pairs for proposing to DUT 104. For example, test emulation device 102 may select p-g pairs$_{1-5}$ for transmission to DUT 104. After said selection, traffic emulation device 102 may send the selected key exchange number pairs (e.g., key exchange number pairs "p-g pairs$_{1-5}$") to DUT 104. Upon receipt, DUT 104 may analyze the proposed p and g values and either i) deem a particular p and g value pair acceptable or ii) reject all of the proposed p and g value pairs. For example, DUT 104 determines whether "p-g pair$_1$" is compatible with and supported by DUT 104 for testing purposes. If "p-g pair$_1$" is not supported or useable by DUT 104, then DUT 104 may select any other one of the received key exchange numbers (e.g., "p-g pair$_2$"-"p-g pair$_5$"). If none of the "p" and "g" pairs sent by traffic emulation device 102 are useable by DUT 104, DUT 104 may contact traffic emulation device 102 in order to request additional key exchange number value pairs for consideration. Once the p-g pair is approved by DUT 104, DUT 104 informs traffic emulation device 102 of the selection.

In alternate embodiments, key exchange number "g" may have a predetermined value (e.g., g=3) that is known and utilized by both traffic emulation device 102 and DUT 104. Similarly, test controller device 101 may also be used to select one or more potential key exchange numbers "$p_1$-$p_n$" that are likely to be compatible with and supported by DUT 104. In some embodiments, the one or more potential key exchange numbers may be stored as key exchange numbers 116 stored in local data store 114.

At block 210, traffic emulation device 102 selects a key sizing constant based on the negotiated key exchange number pair. In some embodiments, traffic emulation device 102 utilizes the key exchange number pair that was negotiated/ selected at line 208 to access data store 114 in order to obtain the appropriate mapped key sizing constant from the data store. For example, traffic emulation device 102 may use a database query containing the p and g pair.

At block 212, the size for the private cryptographic key is determined utilizing the selected key sizing constant. In some embodiments, traffic emulation device 102 determines the size of the private cryptographic key by applying the key sizing constant to a default key size or length. For example, if the key sizing constant was determined to be equal to 0.1 and the default key size is established to be 2048 bits, then traffic emulation device 102 designates the size (or length) of the private cryptographic key to be 26 bytes by calculating the product of these two parameters (e.g., 256 bytes x 0.1=25.6 or 26 bytes). Notably, a calculation using the precalculated key sizing constant only needs to be performed once since it is based on the key exchange number pair that was negotiated between the two test simulation endpoints (e.g., traffic emulation device 102 and DUT 104).

In block 214, the private cryptographic key and the public cryptographic key are generated. In some embodiments, traffic emulation device 102 generates a private cryptographic key in accordance to the key size determined in block 212. In some embodiments, traffic emulation device 102 may generate a private cryptographic key "a" prior to establishing a test session, where "a" is 26 bytes in length. Upon generating the private cryptographic key, traffic emulation device 102 may be configured to subsequently generate a public cryptographic key. In some embodiments, traffic emulation device 102 may generate a public cryptographic key "A" prior to the initiation of the test session. For example, the public cryptographic key may be generated by traffic emulation device 102 based on the formula, $A=g^{a}*$modulo p, where "a" is the private cryptographic key of traffic emulation device 102. Notably, the size of the public cryptographic key will also be effectively reduced since the size of the public cryptographic key is directly based on the size of the private cryptographic key.

In block 215, DUT 104 utilizes the key exchange numbers (e.g., "$p_1$" and "$g_1$" of selected p-g pair$_1$) to generate a public cryptographic key "B". For example, the public cryptographic key may be generated by traffic emulation device 102 based on the formula, $B=g^{a}*$modulo p, where "b" is the private cryptographic key of DUT 104. In some embodiments, DUT 104 may also be configured to reduce the key size of its private cryptographic key "b" in the same manner traffic emulation device reduces the key size of private cryptographic key "a".

In block 216, the public cryptographic keys are exchanged. In some embodiments, traffic emulation device 102 and DUT 104 may communicatively exchange public encryption keys (e.g., via messaging). For example, traffic emulation device 102 may forward the public cryptographic key "A" to DUT 104. Similarly, DUT 104 may forward the public cryptographic key "B" to traffic emulation device 102.

In block 220 and 222, traffic emulation device 102 and DUT 104 respectively generate a shared secret key. For example, traffic emulation device 102 may utilize the public cryptographic key received from DUT 104 along with its own private cryptographic key to generate a shared secret key value. Similarly, OUT 104 may utilize the public cryptographic key received from traffic emulation device 102 along with its own private cryptographic key to generate the shared secret key value. For example, both traffic emulation device 102 and DUT 104 are configured to generate a shared secret key. In some embodiments, the traffic emulation device utilizes its private cryptographic key (e.g., private cryptographic key "a") and the received DUT public cryptographic key (e.g., public cryptographic key "B") to determine a shared secret key "s", where s is equal to the product of $B^a$ and mod p. Specifically, traffic emulation device 102 may use the received public cryptographic key "B" to calculate shared secret key "$s_{TE}$", where $s_{TE}=B^a$ mod p, where mod is a modulo mathematical operation. Similarly, DUT 104 may utilize received public cryptographic key "A" to calculate shared secret key "$s_{DUT}$", where $S_{DUT}=A^b$ mod p. Notably, $s_{TE}$ is equal to $S_{DUT}$. Notably, the shared secret key value generated by each of traffic emulation device 102 and DUT 104 will amount to the same value and/or number and will also be reduced in size or length due to the underlying public cryptographic key and private cryptographic key. Each of traffic emulation device 102 and DUT 104 may subsequently utilize the shared secret key to establish tunnels for the test simulation session (e.g., an IPSec test session).

In block 224, a secure IPsec tunnel is established. In one embodiment, traffic emulation device 102 and DUT 104 utilize the shared secret key to exchange tunnel request and tunnel response messages to establish at least one IPsec tunnel between the traffic emulation device 102 and DUT 104.

FIG. 3 illustrates a flow chart of a method for reducing the size of a cryptographic key in a test simulation environment according to an embodiment of the subject matter described herein. In step 302, a minimum key size ($L_{min}$) and a maximum key size ($L_{max}$) are determined for each of a plurality of key exchange number pairs. In some embodiments, a first test simulation endpoint (e.g., a test emulation device) accesses an acceptable list containing database entries of key exchange number pairs (Diffie-Hellman p-g pairs). For each unique p-g pair, the algorithm determines and/or designates a minimum and maximum key length. For example, for a first p-g pair, the algorithm may determine that $L_{min}$=160 bytes and $L_{max}$=256 bytes. However, for a second p-g pair (e.g., where p is larger), the algorithm may determine that $L_{min}$=256 bytes and $L_{max}$=512 bytes.

In block 304, the minimum key size and maximum key size are utilized to derive a key sizing constant for each key exchange number pair. In some embodiments, the algorithm may derive a key sizing constant ("k") by calculating the quotient of $L_{min}$ and $L_{max}$. More specifically, $k=L_{min}/L_{max}$. Ultimately, the algorithm determines a key sizing constant for each exchange number pair based on that p-g pair's associated $L_{min}$ and $L_{max}$ values. Notably, this calculation of the key sizing constants is performed prior to the initiation of any test simulation sessions (e.g., IPSec test simulations).

In block 306, each key sizing constant is stored with its associated key exchange number pair. In some embodiments, the algorithm may respectively record and/or map the derived key sizing constants to the appropriate p-g pairs in database entries (e.g., contained in a local or external data store).

In block 308, a key exchange number pair is selected for use in a test simulation session. In some embodiments, the first test simulation endpoint (e.g., a test emulation device) and the second test simulation endpoint (e.g., a DUT) are configured to conduct a test simulation session (e.g., an IPSec test simulation). Before establishing or initiating an IPSec tunnel test simulation, the first test simulation endpoint and the second test simulation endpoint may negotiate the p and g values to be used to determine the cryptographic keys and the shared secret value. In some embodiments, the first test simulation endpoint may propose one or more key exchange number pairs to the second test simulation endpoint. In response, the second test simulation endpoint may i) select a single key exchange value pair from among the groups included in the list or ii) reject all the proposed key exchange number pairs. If the second test simulation endpoint indicates that a particular key exchange number pair is appropriate, then the second test simulation endpoint will send a message indicating its selection to the first test simulation endpoint.

In some embodiments, the traffic emulation device may send a message containing a plurality of p values to the DUT. For example, the traffic emulation device may send potential p-g values p-g pair$_1$, p-g pair$_2$, p-g pair$_3$, p-g pair$_4$, and p-g pair$_5$. Upon receiving the message containing potential p-g pair values, the DUT makes a determination whether p-g pain may be used for the test simulation. If p-g pair$_1$ can be used by the DUT, then the DUT ultimately utilizes the p and g values in the p-g pair$_1$ to generate a public cryptographic key B.

If p-g pain cannot be used (e.g., incompatible) by the DUT, the DUT then determines if one of p-g pair$_2$, p-g pair$_3$, p-g pair$_4$, and p-g pair$_5$ can be used in the test simulation. If it is determined that one of one of p-g pair$_2$, p-g pair$_3$, p-g pair$_4$, and p-g pair$_5$ can be used, then the DUT sends a notification message to the traffic emulation device indicating a p-g pair designated by the DUT. If it is determined that none of p-g pair$_1$, p-g pair$_2$, p-g pair$_3$, p-g pair$_4$, and p-g pair$_5$ can be used by the DUT, then the DUT sends a message to the traffic emulation device indicating that all the previously provided p-g pairs are incompatible.

In block 310, the key sizing constant associated with the selected key exchange number pair is selected for use in the test simulation session to be established. In some embodiments, the first test simulation endpoint (which hosts the algorithm) may receive the message indicating the selected key exchange number pair from the second test simulation endpoint device and subsequently access the data entries in the data store using the selected key exchange number pair to obtain the associated key sizing constant.

In block 312, a private cryptographic key is generated utilizing the selected key sizing constant. In some embodiments, the first test simulation endpoint first determines the size of the private cryptographic key to be generated. For example, the first test simulation endpoint may ascertain the private cryptographic key size by multiplying a default key length (e.g., a key length or size that is typically used for encryption security in real network conditions) by the selected key sizing constant (k). After making this determination, the algorithm may generate the private cryptographic key in accordance to the determined key size.

In step 314, the test simulation tunnel is established using at least the reduced-sized private cryptographic key. In some embodiments, the test emulation device establishes an IPsec tunnel with a DUT using the private cryptographic key of the test emulation device. Notably, the IPSec tunnel may be established utilizing a private cryptographic key generated by the DUT as well as the shared secret value that is derived by either of the private keys. Specifically, each of the traffic emulator device and the DUT utilizes its shared secret key to complete the negotiation to establish the IPsec tunnel session.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for reducing the size of a cryptographic key in a test simulation environment, the method comprising:
   determining, by a first test simulation endpoint, a minimum key size value and a maximum key size value for a private cryptographic key for each of a plurality of key exchange value pairs, wherein the key exchange value pair for each private cryptographic key includes at least one numeric value that is used to derive a public cryptographic key and a shared secret key used by the first test simulation endpoint;
   deriving, for each of the plurality of key exchange value pairs, a key sizing constant by dividing the minimum key size value by the maximum key size value;
   storing each of the plurality of selected key exchange value pairs and associated key sizing constant in a data store;
   selecting a key exchange value pair to be applied to a test simulation session conducted between the first test simulation endpoint and a second test simulation endpoint;
   generating a private cryptographic key based on the key sizing constant associated with the selected key exchange value pair, wherein the size of the private cryptographic key is determined by multiplying the key sizing constant and a predefined default size of the private cryptographic key; and
   utilizing the generated private cryptographic key to obtain a shared secret key that is used to establish secure tunnels for communicating test packet traffic in the test simulation session between the first test simulation endpoint and the second endpoint.

2. The method of claim 1 wherein the selected key exchange value pair is determined via negotiation between the first test simulation endpoint and the second test simulation endpoint.

3. The method of claim 1 further comprising generating, by the first test simulation endpoint, a shared secret key by utilizing a public cryptographic key received from the second test simulation endpoint and the generated private cryptographic key.

4. The method of claim 1 where generating the private cryptographic key based on the key sizing constant includes accessing the data store to obtain the key sizing constant using the selected key exchange value pair.

5. The method of claim 1 wherein both the first test simulation endpoint and the second test simulation endpoint are components of a single test emulation device that are communicatively connected via a device under test.

6. The method of claim 1 wherein the first test simulation endpoint is a test emulation device and the second test simulation endpoint is a device under test.

7. A system for reducing the size of a cryptographic key data in a test simulation environment, the system comprising:
   a traffic emulation device configured to determine, prior to the initiation of a test simulation session with a device under test (DUT), a minimum key size value and a maximum key size value for a private cryptographic key for each of a plurality of key exchange value pairs, wherein the key exchange value pair for each private cryptographic key includes at least one numeric value that is used to derive a public cryptographic key and a shared secret key used by the first test simulation endpoint, to derive for each of the plurality of key exchange value pairs a key sizing constant by dividing the minimum key size value by the maximum key size value, to store each of the plurality of selected key exchange value pairs and associated key sizing constant in a data store, to generate a private cryptographic key based on the key sizing constant associated with a key exchange value pair selected for application to the test simulation session conducted between the traffic emulation device and the DUT, wherein the size of the private cryptographic key is determined by multiplying the key sizing constant and a predefined default size of the private cryptographic key, and to utilize the generated private cryptographic key to obtain a shared secret key that is used to establish secure tunnels for communicating test packet traffic in the test simulation session between the first test simulation endpoint and the second endpoint.

8. The system of claim 7 wherein the selected key exchange value pair is determined via negotiation between the traffic emulation device and the DUT.

9. The system of claim 7 further comprising generating, by the traffic emulation device, a shared secret key by utilizing a public cryptographic key received from the DUT and the generated private cryptographic key.

10. The system of claim 7 wherein the traffic emulation device is further configured to access the data store to obtain the key sizing constant using the selected key exchange value pair.

11. The system of claim 7 wherein both the traffic emulation device includes a client component and a server component that are communicatively connected via the DUT.

12. A non-transitory computer readable medium having stored thereon executable instructions that when executed by the processor of a computer control the computer to perform steps comprising:

determining, by a first test simulation endpoint, a minimum key size value and a maximum key size value for a private cryptographic key for each of a plurality of key exchange value pairs, wherein the key exchange value pair for each private cryptographic key includes at least one numeric value that is used to derive a public cryptographic key and a shared secret key used by the first test simulation endpoint;

deriving, for each of the plurality of key exchange value pairs, a key sizing constant by dividing the minimum key size value by the maximum key size value;

storing each of the plurality of selected key exchange value pairs and associated key sizing constant in a data store;

selecting a key exchange value pair to be applied to a test simulation session conducted between the first test simulation endpoint and a second test simulation endpoint;

generating a private cryptographic key based on the key sizing constant associated with the selected key exchange value pair, wherein the size of the private cryptographic key is determined by multiplying the key sizing constant and a predefined default size of the private cryptographic key; and utilizing the generated private cryptographic key to obtain a shared secret key that is used to establish secure tunnels for communicating test packet traffic in the test simulation session between the first test simulation endpoint and the second endpoint.

13. The non-transitory computer readable medium of claim 12 wherein the selected key exchange value pair is determined via negotiation between the first test simulation endpoint and the second test simulation endpoint.

14. The non-transitory computer readable medium of claim 12 further comprising generating, by the first test simulation endpoint, a shared secret key by utilizing a public cryptographic key received from the second test simulation endpoint and the generated private cryptographic key.

15. The non-transitory computer readable medium of claim 12 wherein generating the private cryptographic key based on the key sizing constant includes accessing the data store to obtain the key sizing constant using the selected key exchange value pair.

16. The non-transitory computer readable medium of claim 12 wherein both the first test simulation endpoint and the second test simulation endpoint are components of a single test emulation device that are communicatively connected via a device under test.

17. The non-transitory computer readable medium of claim 12 wherein the first test simulation endpoint is a test emulation device and the second test simulation endpoint is a device under test.

* * * * *